(12) United States Patent
Findlay et al.

(10) Patent No.: US 8,525,789 B2
(45) Date of Patent: Sep. 3, 2013

(54) OPTICAL NAVIGATION DEVICE WITH SNAP FIT OPTICAL TRANSMISSION ELEMENT

(75) Inventors: Ewan Findlay, Dollar (GB); Douglas Stuart Brodie, Edinburgh (GB)

(73) Assignee: STMicroelectronics (Research & Development) Ltd, Marlow, Buckinghamshire (GB)

( * ) Notice: Subject to any disclaimer, the term of this patent is extended or adjusted under 35 U.S.C. 154(b) by 577 days.

(21) Appl. No.: 12/786,065

(22) Filed: May 24, 2010

(65) Prior Publication Data

US 2010/0302159 A1  Dec. 2, 2010

(30) Foreign Application Priority Data

May 26, 2009 (GB) .................................. 0908900.4

(51) Int. Cl.
*G09G 5/08* (2006.01)

(52) U.S. Cl.
USPC ....................................................... 345/166

(58) Field of Classification Search
USPC ............ 345/156, 157, 166; 250/221; 356/71
See application file for complete search history.

(56) References Cited

U.S. PATENT DOCUMENTS

| | | | |
|---|---|---|---|
| 5,528,355 A | 6/1996 | Maase et al. | |
| 5,751,668 A * | 5/1998 | Eray | 368/290 |
| 5,781,651 A | 7/1998 | Hsiao et al. | |
| 6,061,177 A | 5/2000 | Fujimoto | |
| 6,087,953 A | 7/2000 | DeLine et al. | |
| 7,164,411 B2 | 1/2007 | Keranen et al. | |
| 2001/0050765 A1* | 12/2001 | Antonelli et al. | 356/71 |
| 2002/0135565 A1 | 9/2002 | Gordon et al. | |
| 2002/0155857 A1 | 10/2002 | Nishimoto | |
| 2002/0167489 A1* | 11/2002 | Davis | 345/157 |
| 2004/0084610 A1 | 5/2004 | Leong et al. | |
| 2004/0164953 A1* | 8/2004 | Keranen et al. | 345/156 |
| 2004/0208346 A1 | 10/2004 | Baharav et al. | |
| 2006/0007148 A1 | 1/2006 | Theytaz et al. | |
| 2006/0114237 A1 | 6/2006 | Crockett et al. | |
| 2006/0256086 A1 | 11/2006 | Xie et al. | |
| 2007/0131946 A1 | 6/2007 | Spurlock et al. | |
| 2007/0152966 A1 | 7/2007 | Krah et al. | |
| 2007/0152985 A1 | 7/2007 | Ostergaard et al. | |

(Continued)

FOREIGN PATENT DOCUMENTS

| | | |
|---|---|---|
| EP | 0617919 A2 | 10/1994 |
| EP | 1073005 A1 | 1/2001 |

(Continued)

OTHER PUBLICATIONS

EP Search Report and Written Opinion for EP10163869.0 (EP2,256,601) mailed on Mar. 8, 2011 (9 pages).

(Continued)

*Primary Examiner* — Chanh Nguyen
*Assistant Examiner* — Jonathan Blancha
(74) *Attorney, Agent, or Firm* — Gardere Wynne Sewell LLP

(57) ABSTRACT

An optical navigation device includes an optical transmission element, operable in use to transmit light from an illumination source to a sensor via a mousing surface, and a housing unit. The optical transmission element may have an alignment shaft. Ideally the optical transmission element and housing unit are assembled to a substrate by snap-fit. The alignment shaft ensures that the optics are properly aligned to the substrate and the light source and sensor thereon.

40 Claims, 7 Drawing Sheets

(56) References Cited

U.S. PATENT DOCUMENTS

| | | |
|---|---|---|
| 2007/0199804 A1* | 8/2007 | Joseph et al. .................. 200/5 A |
| 2008/0029691 A1 | 2/2008 | Han |
| 2008/0170927 A1* | 7/2008 | Boraas ............................ 411/48 |
| 2008/0231600 A1 | 9/2008 | Smith |
| 2008/0284925 A1 | 11/2008 | Han |
| 2009/0128499 A1 | 5/2009 | Izadi et al. |
| 2009/0279403 A1 | 11/2009 | Nishiwaki et al. |

FOREIGN PATENT DOCUMENTS

| | | |
|---|---|---|
| EP | 1271395 A1 | 1/2003 |
| EP | 1437677 A1 | 7/2004 |
| WO | WO-2006080601 A1 | 8/2006 |

OTHER PUBLICATIONS

Search Report, Application No. GB0908900.4, Sep. 2, 2009.

* cited by examiner

OPTICAL NAVIGATION DEVICE WITH SNAP FIT OPTICAL TRANSMISSION ELEMENT

PRIORITY CLAIM

The present application claims the benefit of Great Britain Application for Patent No. 0908900.4 filed May 26, 2009, the disclosure of which is hereby incorporated by reference.

TECHNICAL FIELD

The present invention relates to improvements in or relating to optical navigation devices, particularly but not exclusively in respect of miniature devices for use in mobile personal computer applications.

BACKGROUND

Current mobile devices use a variety of different navigation mechanisms. Touchscreen panels are navigated by means of direct contact with screen. Other devices make use of trackball devices where a mechanical signal is translated into position data to enable the navigation to occur. A further navigation device makes use of a multi-click joystick to enable the necessary navigation. There are problems associated with each of the currently available navigation mechanisms. For example, the touchscreen panel has shown been shown to be somewhat unreliable, while the trackball and joystick may also be unreliable as well as relatively expensive to implement.

For larger scale computer devices optical mice have been used for some time for navigation purposes. These devices are generally too large and impractical for mobile applications due to ergonomic and economic issues. In addition, miniaturization of the typical optical mice has not been successful.

There is a need in the art to overcome at least some of the problems associated with the prior art.

There is further a need in the art to apply optical mouse technology to the mobile domain.

SUMMARY

According to one aspect there is provided an optical navigation device comprising two main elements, an optical transmission element which provides a mousing surface and which, in use, transmits light from an illumination source to a sensor via said mousing surface, and a main housing element, for providing a housing for said illumination source, sensor and optical transmission element.

Said mousing surface may be of a type that is operable by moving a digit over it, such that the digit's movement is translated by said optical navigation device to perform navigation.

Preferably said two main elements are attachable together to a base by snap-fitting the two main elements and base together without the need of adhesive or similar. Said optical transmission element may be provided with first attachment means such that, when said optical transmission element is pushed into said main housing element and partly through at least one aperture in said base, said first attachment means cooperates with said base so as to lock said base and main elements together. Said first attachment means may be operable to deform to allow it to be pushed through said at least one aperture in said base, a part of said attachment means then being operable to abut against the underside of said base to lock said optical transmission element, and said main housing element, in place.

Said optical transmission element may comprise a shaft extending from the center of its underside for aligning the optical transmission element to the base. Said first attachment means may be located at or near the bottom end of said shaft thereby, in use, aligning said optical transmission element to the lower surface of the base. Alternatively, said first attachment means may be located at one or more points separate from said shaft, said shaft comprising at its end at least one abutment for abutting against the upper surface of said base, thereby aligning said optical transmission element to said upper surface of the base.

Ideally, said snap fitting should be such that a significant force is required to push said first attachment means through the base and so that it locks under tension. This is to align the optical transmission element to the base with no additional tolerance stack-up. Said tension may be provided by the main housing element or a gasket located between the main housing element and the base. Said arrangement may be such as to provide a kinematic coupling between said optical transmission element and said base.

Said optical transmission element may be formed from a single piece of material, preferably plastic. Said single piece of material may comprise input and output lenses. Said main housing element may comprise integrally an optical stop which forms an aperture for one of said lenses, preferably the output lens. Said lenses may be of a single optical surface, or comprise a "fly-eye" structure of lens-lets.

Preferably there is provided a second attachment means for attaching together the two main elements prior to final assembly to a base, said attachment being effected by pushing said optical transmission element into said main housing element until said second attachment means actuates so as to hold the two elements together. Said second attachment means may be located on an intermediate point of said shaft.

Said housing element may comprise walls which prevent light from said illumination source being transmitted to said optical navigation device other than via said optical transmission element.

Said optical navigation device may incorporate an integral switch. Said switch may be located below said base. Said optical navigation device may be operable such that said optical transmission element is the actuator interface to operate the switch. Said switch may be a domed switch.

According to a second aspect there is provided an optical navigation device comprising a main housing element and an optical transmission element, said optical transmission element being operable in use to transmit light from an illumination source to a sensor via a mousing surface, said optical transmission element comprising an alignment shaft which, when assembling said optical transmission element and said main housing element to a base, is operable to align said optical transmission element to said base.

Said mousing surface may be of a type that is operable by moving a digit over it, such that the digit's movement is translated by said optical navigation device to perform navigation.

Said optical transmission element may be formed from a single piece of material, preferably plastic. Said single piece of material may comprise input and output lenses. Said main housing element may comprise integrally an optical stop which forms an aperture for one of said lenses, preferably the output lens.

In a main embodiment said alignment is such that input and output lenses provided on said optical transmission element is aligned with said illumination source and sensor, said illumination source and sensor being comprised with the base prior to assembly.

Said optical transmission element may comprise a first attachment means operable to hold together said main housing element and said optical transmission element to said base by snap-fitting said elements and base together without the need of adhesive or similar.

Said first attachment means may be operable, during assembly, to be pushed through said main housing element and at least partly through at least one aperture in said base, until said first attachment means cooperates with said base so as to lock both main elements together to said base. Ideally, said snap fitting should be such that a significant force is required to push said first attachment means through the base and so that it locks under tension. This is to align the optical transmission element to the base with no additional tolerance stack-up. Said tension may be provided by the main housing element or a gasket located between the main housing element and the base. Said arrangement may be such as to provide a kinematic coupling between said optical transmission element and said base.

Said alignment shaft may comprise said attachment means at its end such that, when assembled, said attachment means abut against the underside of said base thereby aligning said optical transmission element to the lower surface of the base. Alternatively, said first attachment means may be located at one or more points separate from said shaft, said shaft comprising at its end at least one abutment for abutting against the upper surface of said base, thereby aligning said optical transmission element to said upper surface of the base.

Said alignment shaft may extend from the center of the underside of said optical transmission element.

Said first attachment means may be operable to deform to allow it to be pushed through said at least one aperture in said base, a part of said attachment means then being operable to abut against the underside of said base to lock said optical transmission element, and said main housing element, in place.

Preferably there is provided a second attachment means for attaching together the two main elements prior to final assembly, said attachment being effected by pushing said optical transmission element into said main housing element until said second attachment means actuates so as to hold the two elements together. Said second attachment means may be located at an intermediate point on said alignment shaft.

Said optical navigation device may incorporate an integral switch. Said switch may be located below said base. Said optical navigation device may be operable such that said optical transmission element is the actuator interface to operate the switch. Said switch may be a domed switch.

BRIEF DESCRIPTION OF THE DRAWINGS

Embodiments will now be described, by way of example only, by reference to the accompanying drawings, in which.

DETAILED DESCRIPTION OF THE DRAWINGS

Figure 1:
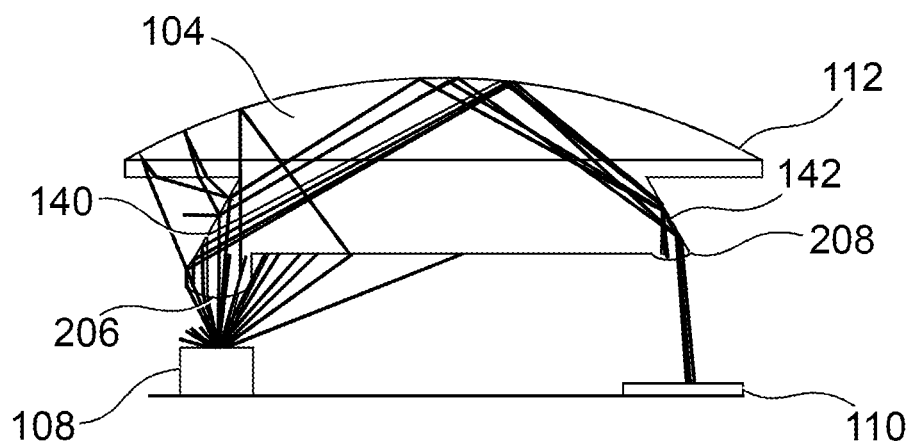
FIG. 1 illustrates the ray paths through an optical interface component comprised in the optical navigation device of an embodiment, given by way of example.
Figure 2:
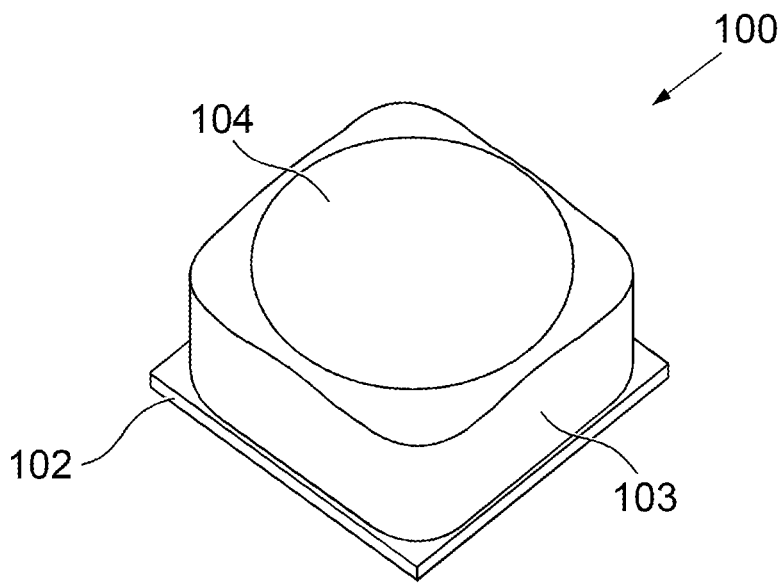
FIG. 2 is an isometric view of an optical navigation device; in accordance with an embodiment, given by way of example.

FIG. 1 shows the rays passing through an optical interface component 104 of a novel optical navigation device, so as to illustrate the basic concept of its operation. The type of optical navigation device illustrated in this example uses the optical layout for a frustrated total internal reflection (F-TIR) device. An illumination source, such as an infra-red light emitting diode (LED) 108, emits a source of radiation which enters optical interface component 104 via lens 206 and is directed by optical element 140 to a mousing surface 112. A further optical element 142 then directs any reflected illumination from surface 112, via lens 208 onto a sensor 110.

The optical navigation device 100 is essentially split into three main components: an optical interface to the mousing surface 112; the adaptation of the optical elements to provide additional advantages in terms of mechanical construction; and the interface of the mouse or optical device with the user. The specific optical design maximizes the accuracy of the navigation process in a low profile package. This application is largely concerned with the second of these components, that is the mechanical construction. The optical aspects of this device, and the resultant optical advantages are described in the co-pending application number GB 0908899.8, the disclosure of which is hereby incorporated by reference.

The system works in essentially a similar way as an optical mouse, in that any movement in the surface pattern of an object, for example a finger, placed on the "mousing surface" 112 of the optical interface component 104 causes changes in the imaged reflected light at the sensor 110, which senses the reflected light in frames. Changes between one frame and the next are processed by an image processing circuit/program and translated into movement on the two axes using an optical flow estimation algorithm or equivalent so as to control a cursor or similar.

FIGS. 2, 3, 4 and 5 show a novel optical navigation device 100, respectively in its final constructed state as will be provided to the end customer, exploded so as to show the components in assembly, in cross-section, and in cross section plan view. The overall construction of the optical navigation device 100 is of a low profile construction making it suitable for mobile devices. The actual size of the overall package is typically of the order of about 5 mm in length.

Figure 3:
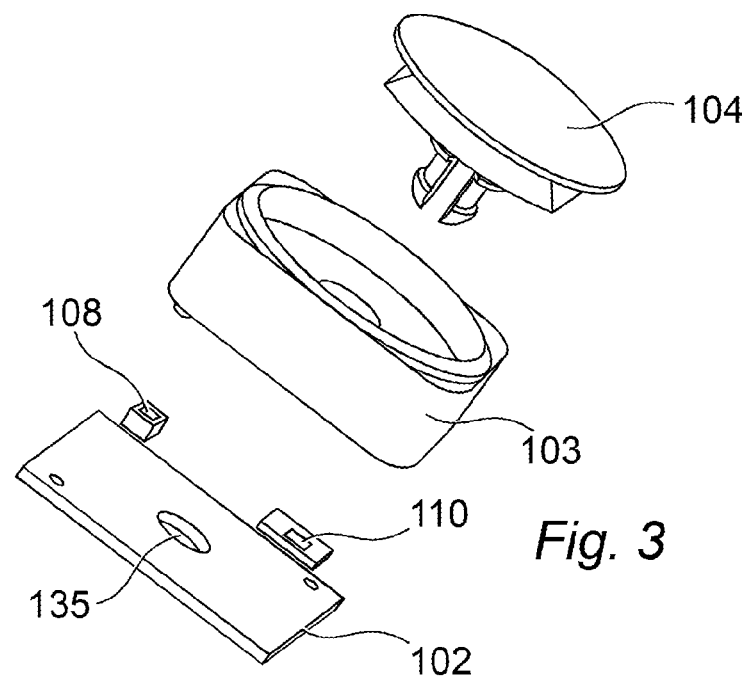
FIG. 3 is an exploded view of the optical navigation device of FIG. 2.
Figure 4:
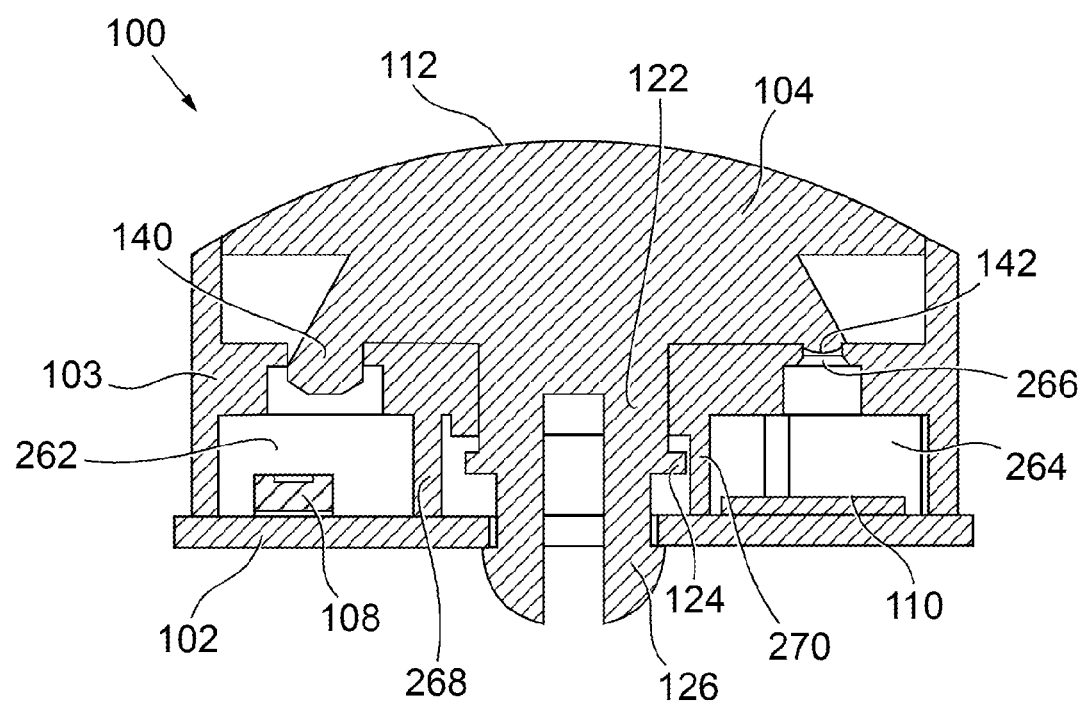
FIG. 4 is a cross-sectional view of the optical navigation device of FIG. 2.
Figure 5:
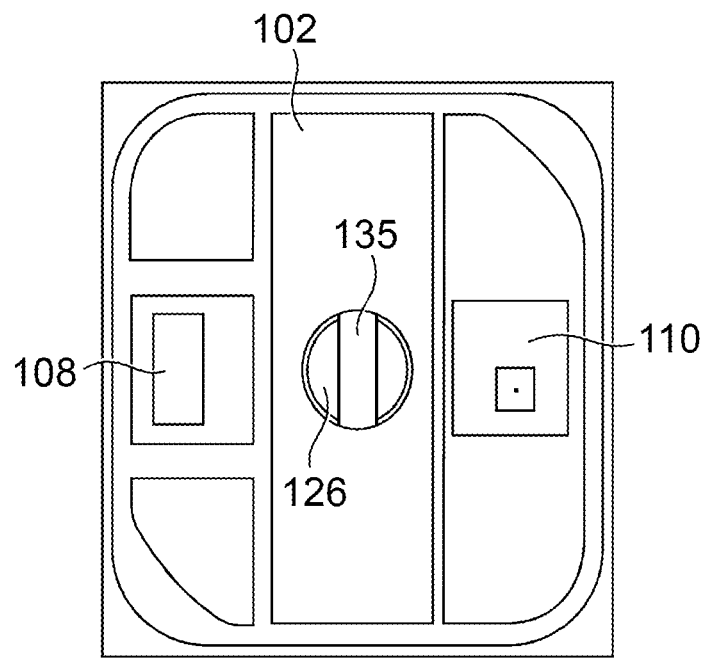
FIG. 5 is a cross-sectional plan view of the optical navigation device of FIG. 2.

As can be seen in FIG. 3 the device consists of a substrate/base plate 102, a main housing section 103 and an optical interface component 104. The substrate 102 comprises an illumination source 108, such as an infra-red light emitting diode (LED) and sensor 110.

The main housing component 103 has several functions inherent in its design. The main function of the housing 103 is to provide a structural assembly for the device 100, although it also has some key features which aid the ease of assembly and construction. It has two cut outs 262, 264 which mate with the lens surfaces. Also an optical stop 266 is provided to form an aperture at the lens for the imaging sensor. This is molded as part of the housing 104 thus reducing assembly complexity. Additionally two internal walls 268, 270 are molded which prevent any light "leaking" between the LED and sensor and impairing the function of the device.

Figure 6:
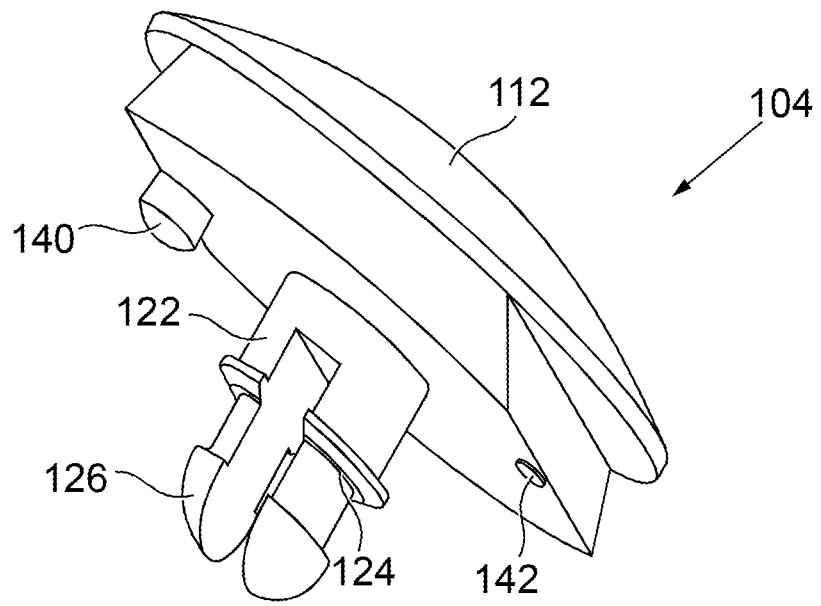
FIG. 6 is an optical interface component comprised in the optical navigation device of FIG. 2.

FIG. 6 shows the optical element 104 in greater detail. It is molded from a single piece of plastic and provides the mousing surface 112, and two optical surfaces 140, 142 which are molded to act as lenses for transmitting light in and out of the optical element 104. In one example, at least one of these lenses is of a "fly-eye" type. An example of a suitable type of plastic material is poly (methyl methacrylate) also known as PMMA, although other plastics or even other materials altogether, may be substituted.

The optical element 104 incorporates a central pillar 122, which acts as an alignment feature to register the mousing surface to the housing and substrate. The central pillar 122 has two clips. The upper clip 124 allows assembly of the housing to the optics before the final assembly, for ease of construction and shipping. This clip 124 can be a relatively loose fit and should allow a minimum vertical movement of around 300 microns so as to prevent over-straining the components. The optical element 104 is simply pushed into the housing component 103 until the upper clip snaps home, hooking onto an underside portion of the housing component 103.

The lower clip 126, located at the bottom of the pillar 122, acts as the main structural clip to affix the housing and mousing surface to the substrate. This clip 126 makes a snap fit connection with the base plate 102, by passing through an aperture 135 in the base plate 102 and hooking onto its underside. The clip 126 should require some force, for example 10N-15N over vertical, to snap it home into its assembled position, and should remain under slight upwards tension. This tension may be provided by a gasket (not shown) attached to the base of the main housing to provide an opposing force to the clip during (and after) assembly, as well as providing a dust seal.

This snap fit construction allows for simple assembly in that the optical element 104, housing component 103 and base plate 102 are simply snapped together in a single action without the need of any adhesive. Furthermore, the base is pre-manufactured with LED 108, sensor 110 and hole 135 for receiving the lower clip 126 accurately positioned. Consequently, assembling the optical navigation device 100 together by snap fitting lower clip 126 through hole 135 aligns the lens moldings 140, 142 to the LED 108 and sensor 110. More importantly the lower clip 126 ensures that the optical element 104 is aligned to one surface (in this embodiment, the bottom surface) of the base plate 102 with minimal tolerance stack up. Standard designs use a stack up of components, for example the optics are typically clipped to the housing which then attaches to the substrate, which means that there are two tolerances in the stack. This design aligns the optics to the substrate where the silicon sensor is attached, removing a critical tolerance and enabling the design to be cheaply made without precision moldings. This tolerance stack up is further reduced if the assembly is maintained under tension, as explained above. This results in a kinematic coupling between optical element 104 and base plate 102.

Figure 7:
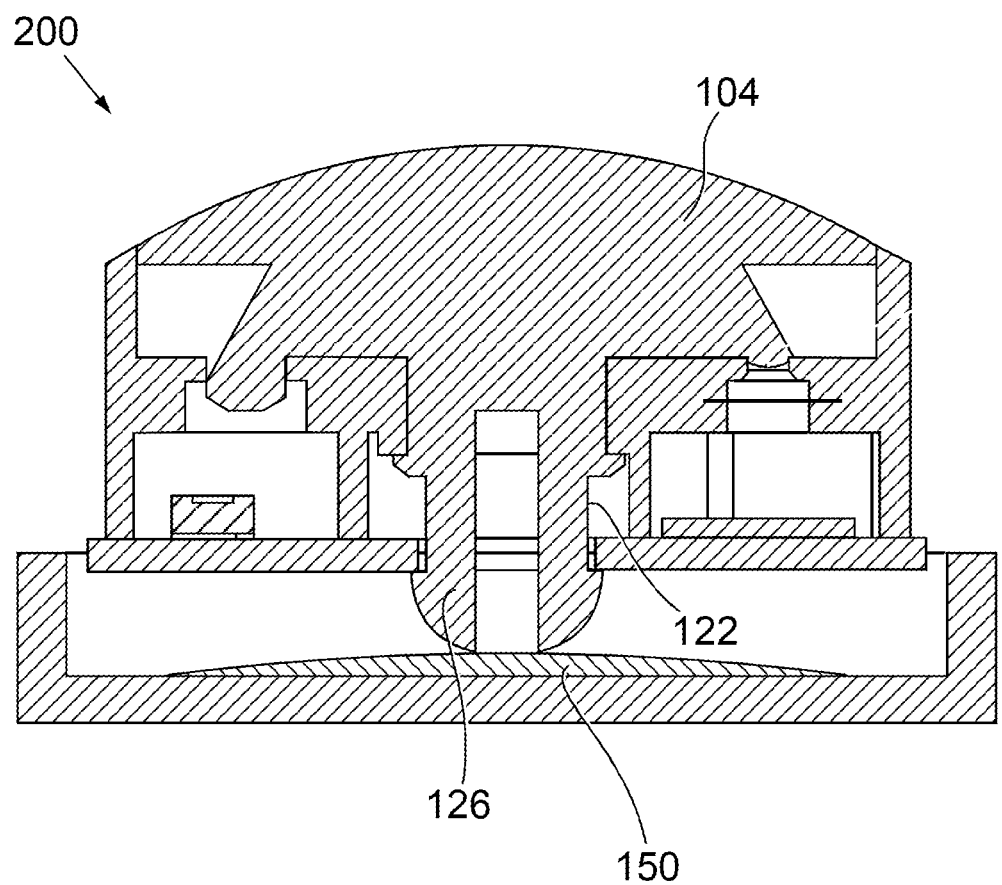
FIG. 7 is a cross-sectional view of a further optical navigation device, in accordance with an embodiment, given by way of example.
Figure 8:
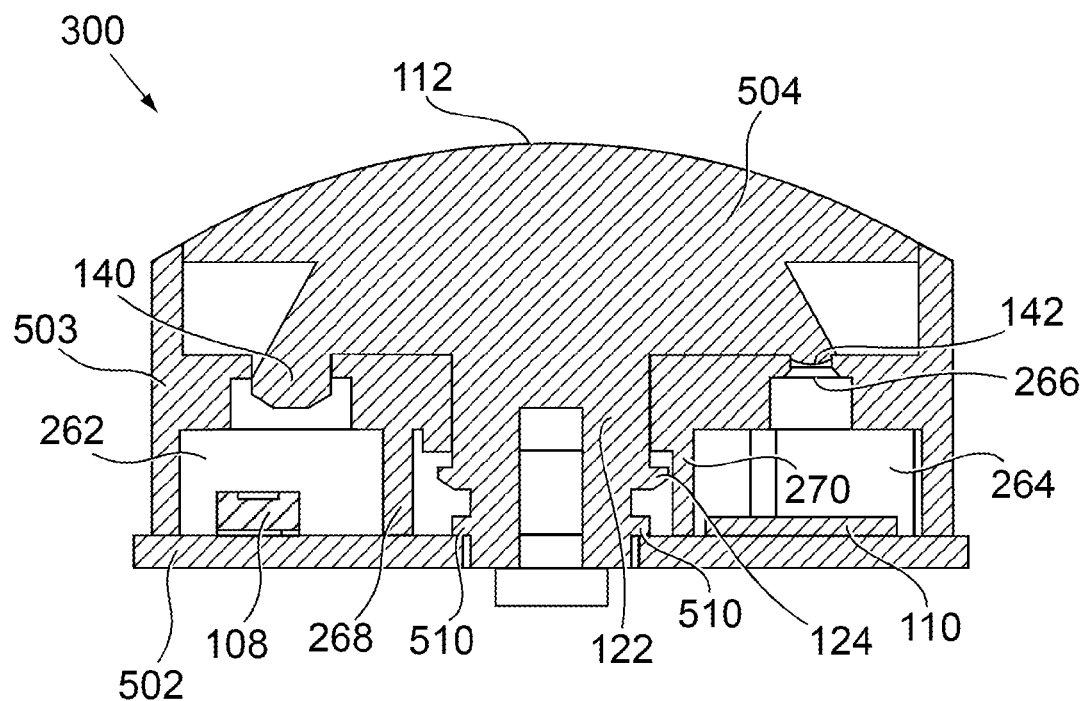
FIG. 8 is a cross-sectional view along its x-axis of a further optical navigation device, in accordance with an embodiment, given by way of example.
Figure 9:
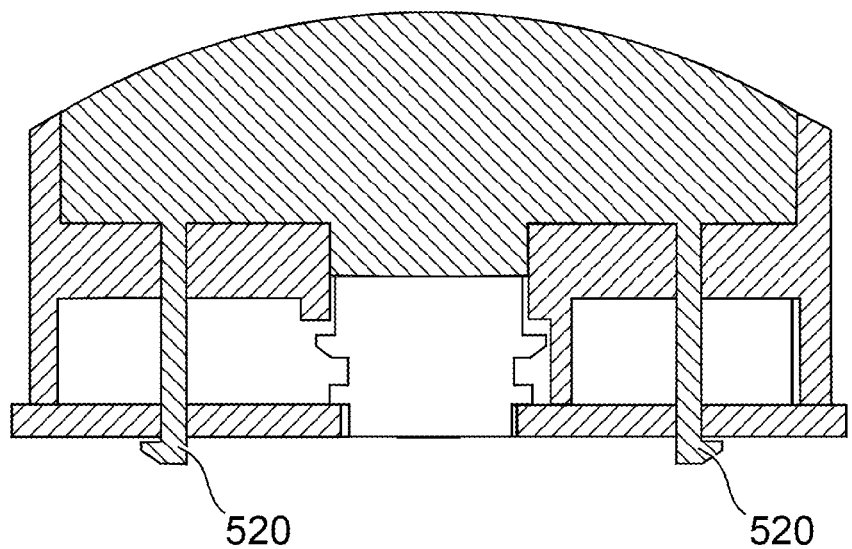
FIG. 9 is a cross-sectional view along its y-axis of the optical navigation device of FIG. 8.
Figure 10:
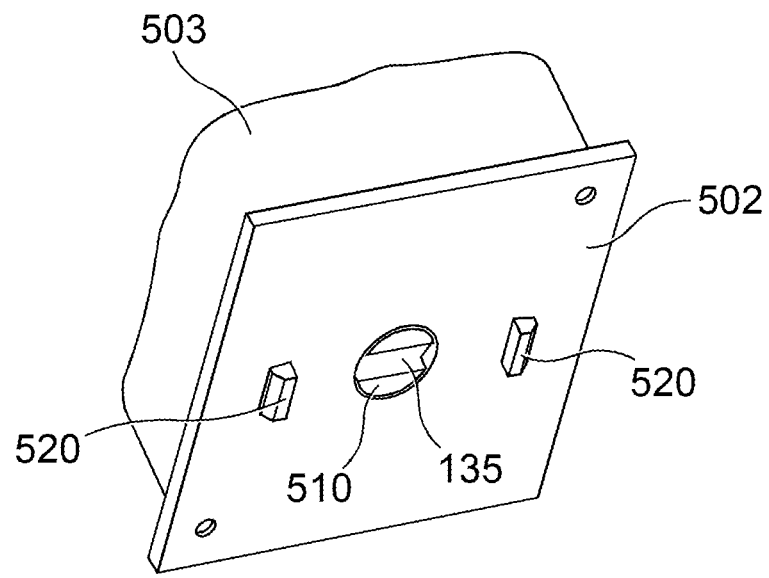
FIG. 10 is an isometric view of the optical navigation device of FIG. 8.
Figure 11:
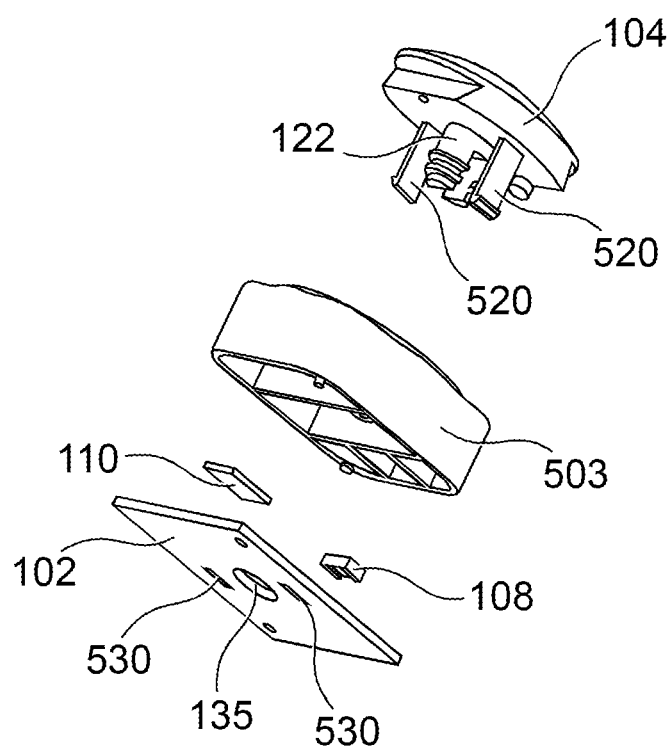
FIG. 11 is an exploded view of the optical navigation device of FIG. 8.
Figure 12:
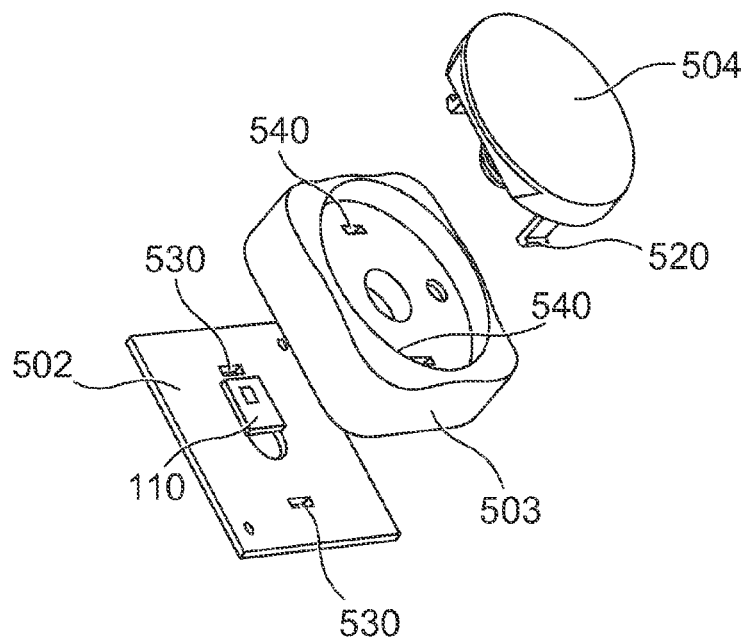
FIG. 12 is a further exploded view of the optical navigation device of FIG. 8.

FIG. 7 shows an embodiment 200 whereby a switching action can be incorporated into the device 100. In this example, the central pillar 122 extends below the substrate and is formed such that it may contact a domed switch 150 below the assembly. The domed switch 150, when pressed, provides an electrical connection as well as tactile feedback to the end user, by providing a "click" action when pressed. The end of the pillar 122 can be formed with a specific profile which optimizes the contact with the domed switch 150 compared to having a standard planar surface. The fact that the pillar 122 extends though housing and can act as an activation area for dome switch 150 reduces the need for extra components to contact the switch.

FIGS. 8, 9, 10, 11 and 12 show a further embodiment of an optical navigation device 300 in cross-section along its x-axis, in cross-section along its y-axis, an isometric view from below, an exploded view from the side and an exploded view from above, respectively. This embodiment has changed the molding of optical element 504 by replacing lower clip 126 with stops or abutments 510 and (in this example) two clips 520. These stops 510 abut the top surface of the base plate 502, while the two clips 520 are spaced away from pillar 122. These clips 520 are designed to be pushed through two further purpose made holes 530 in the base plate 502, so that they clip to its underside, the base plate 502 being held between the stops 510 and clips 520. Housing 503 also requires the addition of holes 540 to allow clips 520 to pass through it.

Figure 13:
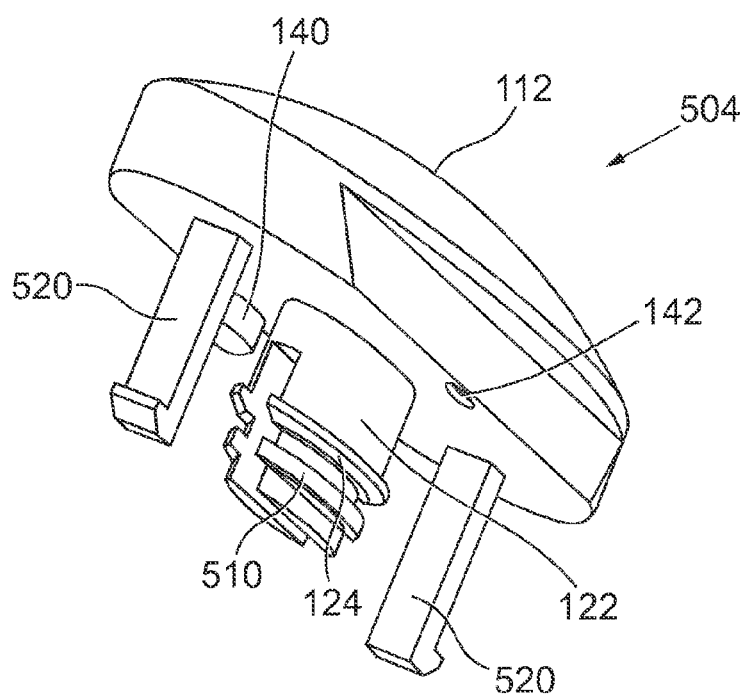
FIG. 13 is an optical interface component comprised in the optical navigation device of FIG. 8.

FIG. 13 shows the optical element 504 of this embodiment in greater detail. It is again molded from a single piece of plastic. Of course, there may be a different clip arrangement to that shown, with more or less clips, or clips in different positions.

A main advantage to this embodiment is that, due to the stops 510, the optical element 504 is now aligned to the top surface of the base 502. As this is the same surface to which the sensor 110 is attached, tolerances are reduced further.

The above examples are for illustration only and are not intended to be limiting. It will be apparent to the skilled person that other embodiments and examples can be envisaged without departing from the spirit and scope of the invention.

What is claimed is:

1. An optical navigation device comprising:
an optical transmission element which provides a mousing surface and which, in use, transmits radiation from an illumination source to a sensor via said mousing surface, and further including a clip structure,
a housing element for providing a housing for said illumination source, sensor and optical transmission element,
a base including at least one first opening, and
wherein the optical transmission element and housing element are attachable together to said base by insertion of the clip structure through said first opening for a snap fit of the optical transmission element and housing element and base together.

2. The optical navigation device of claim 1 wherein said mousing surface is of a type that is operable by moving a digit over the mousing surface such that the digit's movement is detectable.

3. The optical navigation device of claim 1 wherein the housing element further includes at least one second opening aligned with said at least one first opening, and wherein the clip structure extends through both the first and second openings.

4. The optical navigation device of claim 3 wherein said clip structure comprises a shaft extending from a center of an underside of the optical transmission element for aligning the optical transmission element to the base and housing element through the first and second openings.

5. The optical navigation device of claim 3 wherein said clip structure is provided with a first attachment mechanism such that, when said clip structure is pushed through the second opening of said housing element and through said first opening in said base, said first attachment mechanism cooperates with said base so as to lock said base and optical transmission element and housing element together.

6. The optical navigation device of claim 5 wherein said first attachment mechanism is operable to deform to allow it to be pushed through said first opening in said base, a part of said first attachment mechanism then being operable to abut against an underside of said base to lock said optical transmission element and said housing element in place.

7. The optical navigation device of claim 5 wherein said first attachment mechanism of the clip structure is located at or near the bottom end of a shaft extending from a center of the underside of the optical transmission element thereby, in use, aligning said optical transmission element to the base.

8. The optical navigation device of claim 5 further comprising a shaft extending from a center of an underside of the optical transmission element for aligning the optical transmission element to an opening in the base, wherein said clip structure and first attachment mechanism are located separate from said shaft, said shaft having an end with at least one abutment for abutting against an upper surface of said base, thereby aligning said optical transmission element to said upper surface of the base.

9. The optical navigation device of claim 5 arranged such that a force is required to push said first attachment mechanism through the first opening in the base and lock, the assembled device thereafter remaining under tension.

10. The optical navigation device of claim 9 wherein said force is resultant from the main housing element or a gasket located between the main housing element.

11. The optical navigation device of claim 9 wherein a kinematic coupling is provided between said optical transmission element and said base.

12. The optical navigation device of claim 1 wherein said optical transmission element is formed from a single piece of material, preferably plastic.

13. The optical navigation device of claim 12 wherein said single piece of material comprises input and output lenses.

14. The optical navigation device of claim 13 wherein said main housing element comprises integrally an optical stop which forms an aperture for one of said lenses, preferably the output lens.

15. The optical navigation device of claim 1 wherein said housing element comprises walls which prevent light from said illumination source being transmitted to said sensor other than via said optical transmission element.

16. The optical navigation device of claim 1 wherein said optical navigation device incorporates an integral switch.

17. The optical navigation device of claim 16 wherein said switch is located at said base.

18. The optical navigation device of claim 16 wherein said optical navigation device is operable such that said optical transmission element is the actuator interface to operate the switch.

19. The optical navigation device of claim 18 wherein said switch is a domed switch.

20. An optical navigation device comprising:
an optical transmission element which provides a mousing surface and which, in use, transmits radiation from an illumination source to a sensor via said mousing surface, and further including a clip structure,
a housing element for providing a housing for said illumination source, sensor and optical transmission element,
a base including a first opening, and
wherein the optical transmission element and housing element are attachable together to said base by insertion of the clip structure through said first opening for a snap fit of the optical transmission element and housing element and base together; and
a second attachment mechanism for attaching together the optical transmission element and housing element prior to final assembly to the base, said attachment being effected by pushing said second attachment mechanism of the optical transmission element into a second opening in said housing element until said second attachment mechanism actuates so as to hold the optical transmission element and housing element together.

21. The optical navigation device of claim 20 wherein said second attachment mechanism is located on an intermediate point of said shaft.

22. An optical navigation device comprising:
a main housing element, a base and an optical transmission element,
said optical transmission element being operable in use to transmit light from an illumination source to a sensor via a mousing surface,
said optical transmission element comprising an alignment shaft which, when assembling said optical transmission element and said main housing element to the base, is operable to align said optical transmission element to said base,
said alignment shaft further including a clip structure configured to extend through an opening in the base and engage an underside surface of the base for a snap fit of the main housing element, base and optical transmission element together; and
a second attachment mechanism for attaching together the main housing element and optical transmission element prior to final assembly, said attachment being effected by pushing said optical transmission element into said main housing element until said second attachment mechanism actuates so as to hold the main housing element and optical transmission element together.

23. The optical navigation device of claim 22 wherein said mousing surface is of a type that is operable by moving a digit over the mousing surface such that the digit's movement is detectable.

24. The optical navigation device of claim 22 wherein said optical transmission element is formed from a single piece of material, preferably plastic.

25. The optical navigation device of claim 22 wherein said optical transmission element comprises input and output lenses.

26. The optical navigation device of claim 25 wherein said main housing element comprises integrally an optical stop which forms an aperture for one of said lenses, preferably the output lens.

27. The optical navigation device of claim 25 wherein said alignment is such that input and output lenses provided on said optical transmission element are aligned with said illumination source and sensor, said illumination source and sensor being comprised with the base.

28. The optical navigation device of claim 22 wherein said alignment shaft extends through a first opening in said main housing element and a second opening in said base.

29. The optical navigation device of claim 28 wherein said alignment shaft is located at a center of said optical transmission element.

30. The optical navigation device of claim 22 wherein said snap fit is such that a force is required to push said clip structure through the base to lock, the assembled device remaining under tension.

31. The optical navigation device of claim 30 wherein said force is provided by the main housing element or a gasket located between the main housing element and the base.

32. The optical navigation device of claim 30 wherein a kinematic coupling is provided between said optical transmission element and said base.

33. The optical navigation device of claim 22 further comprising a center alignment shaft extending from said optical transmission element to engage said base, wherein said alignment shaft and clip structure are located at one or more points separate from said center alignment shaft, said center alignment shaft having an end with at least one abutment for abutting against an upper surface of said base, thereby aligning said optical transmission element to said upper surface of the base.

34. The optical navigation device of claim 22 wherein said alignment shaft extends from a center of the underside of said optical transmission element.

35. The optical navigation device of claim 22 wherein said second attachment mechanism is located at an intermediate point on said alignment shaft.

36. The optical navigation device of claim 22 wherein said optical navigation device incorporates an integral switch.

37. The optical navigation device of claim 36 wherein said switch is located at said base.

38. The optical navigation device of claim 36 wherein said optical navigation device is operable such that said optical transmission element is the actuator interface to operate the switch.

39. The optical navigation device of claim 38 wherein said switch is a domed switch.

40. The optical navigation device of claim 22 comprising a frustrated total internal reflection (F-TIR) device wherein an object contacting the mousing surface frustrates the total internal reflection of said light in said optical transmission element.

* * * * *